United States Patent [19]

Patarin

[11] Patent Number: 5,790,675
[45] Date of Patent: Aug. 4, 1998

[54] CRYPTOGRAPHIC COMMUNICATION PROCESS

[75] Inventor: Jacques Patarin, Viroflay, France

[73] Assignee: CP8 Transac, Louveciennes, France

[21] Appl. No.: 685,856

[22] Filed: Jul. 24, 1996

[30] Foreign Application Priority Data

Jul. 27, 1995 [FR] France ................. 95 09179

[51] Int. Cl.$^6$ .................................................. H04K 1/00
[52] U.S. Cl. ........................... 380/23; 380/28; 380/30; 380/46
[58] Field of Search .................... 380/30, 28, 23, 380/25, 46, 49

[56] References Cited

U.S. PATENT DOCUMENTS

| | | | |
|---|---|---|---|
| 5,537,475 | 7/1996 | Micali | 380/30 |
| 5,577,124 | 11/1996 | Anshel et al. | 380/46 |
| 5,600,725 | 2/1997 | Rueppel et al. | 380/30 |

OTHER PUBLICATIONS

Advances in Cryptology, Crypto '85, 18 Aug. 1985, Berlin, pp. 340–349, XP002000399, H. Fell et al., "Analysis of a Public Key Approach Based on Polynomial Substitution".

Electronics and Communications in Japan, Part 3 (Fundamental Electronic Science), Jul. 1990, USA, vol. 73, No. 7, ISSN 1042–0967, pp. 1–17, XP002000400, Matsumoto et al., "An Efficient Asymmetric Cryptosystem Supporting Authenticity and Confidentiality With Public Multivariate Polynomial Tuples".

*Primary Examiner*—David C. Cain
*Attorney, Agent, or Firm*—Edward J. Kondracki; Kerkam, Stowell, Kondracki & Clarke, P.C.

[57] ABSTRACT

A novel asymmetrical cryptographic schema which can be used for enciphering, signature and authentication. The schema is based on low degree public polynomial equations with value in a finite ring K.

The mechanism is not necessarily bijective. The secret key makes it possible to hide polynomial equations with value in extensions of the ring K. The solving of these equations makes it possible, if one has the secret key, to execute operations which are not executable with the public key alone.

20 Claims, 2 Drawing Sheets

CRYPTOGRAPHIC COMMUNICATION PROCESS

FIELD OF THE INVENTION

The invention relates to an asymmetrical cryptographic communication process for processing messages and protecting communications between interlocutors. It can be used to encipher messages asymmetrically or to sign them, also asymmetrically. It can also be used in asymmetric authentication.

DESCRIPTION OF RELATED ART

A well-known first solution was developed in 1977. This solution was the subject of U.S. Pat. No. 4,405,829 filed by the inventors Rivest, Shamir and Adleman on Dec. 14, 1977. This solution, commonly called RSA from the names of the inventors, uses two types of keys. The first key (Kp) allows the enciphering of messages and the second (Ks) allows their deciphering. This process, which is known throughout the world, is the basis for asymmetric cryptography, so called because the keys for enciphering and deciphering are different. In the same network, each member (i) possesses a pair of keys. The first ($Kp_i$) is public and can therefore be known by anyone; the second ($Ks_i$) is secret and must never be communicated.

An enciphered communication between two interlocutors (1) and (2) in the same network is carried out in the following way: (1) and (2) communicate their public keys ($Kp_1$) and ($Kp_2$) to one another ahead of time; then, when (1) desires to send a message (M) to (2), he enciphers the message with the key ($Kp_2$), and once this message is received by (2) it can only be deciphered with the aid of the secret key ($Ks_2$) held by (2):

Enciphering: M'=RSA (M, $Kp_2$)

Deciphering: M=RSA (M', $Ks_2$)

When (2) desires to send a message to (1), he enciphers it using the public key belonging to (1): ($Kp_1$), and he deciphers with his own secret key ($Ks_1$).

The RSA process can also be used for signature: the message is then enciphered with an individual's secret key and the enciphered message, called a signature is then transmitted with the message in unenciphered form; the receiver of the message requests an authority for the individual's public key and uses it to decipher the signature; if the deciphered text corresponds to the unenciphered message, the signature is authentic.

This cryptographic communication process has several drawbacks. The numbers to be manipulated are quite large (typically 512 bits at present), which requires numerous calculations to be performed and leads to signatures which are very long. Moreover, the security of RSA would be compromised if new breakthroughs in factorization were to be achieved.

Other asymmetrical cryptographic communication processes have been suggested for performing the functions of asymmetric enciphering or signature of messages, such as those which use "knapsack"-based algorithms or the MATSUMOTO-IMAI algorithm. However, these two examples have been shown to have a degree of security which is entirely insufficient.

SUMMARY OF THE INVENTION

The present invention proposes a solution which does not have the drawbacks of these two examples, but which retains a certain number of their advantages. The present invention uses a novel algorithm called a "Hidden Fields Algorithm" or HFE (Hidden Fields Equation) which, like RSA, can be used for the functions of authentication, enciphering and signature. Moreover, while RSA is chiefly based on the problem of factorizing large numbers, the HFE algorithm is based on a completely different problem: the solving of multivariable low degree equations (typically with a degree of 2 or 3). It must be noted that the MATSUMOTO-IMAI algorithm also had this property but, as already indicated, it has been shown to have a degree of security which is entirely insufficient, which renders it unsuitable for utilization in a cryptographic communication process. The author of the present invention is also the person who discovered that the MATSUMOTO-IMAI algorithm was not cryptographically solid.

Among the novel elements which can contribute to the solidity of the HFE algorithm are the fact that this algorithm is not necessarily bijective, and the fact that it can use very general polynomial equations.

Another advantage which arises from the invention is the ability of the HFE algorithm to calculate ultrashort signatures (less than 200 bits), whereas the shortest asymmetric signatures known at present are on the order of 220 or 320 bits (obtained with the aid of the SCHNORR algorithm or the DSS algorithm. These algorithms can be used for signature or authentication only, not for enciphering/deciphering). It is preferable to use at least 512 bits when using RSA.

Definitions:

1. An "extension" with a degree of N of a ring A is any isomorphic algebraic structure with A[X]/g(X) in which A[X] is the ring of the polynomials with an indeterminant on A, and in which g(X) is a polynomial with a degree of n.

A particularly advantageous case is the one in which A is a finite field $F_q$ and g is an irreducible polynomial with a degree of n on $F_q$. In this case, A[X]g/(X) is a finite isomorphic field with $F_q n$.

2. A "base" of an extension $L_n$ of A with a degree of n is a family of n elements of $L_n$, ($e_1, e_2, \ldots, e_n$), such that every element e of $L_n$ is expressed in a unique way in the form $$e = \sum_{i=1}^{n} \alpha_i e_i \text{ with } \alpha \in A$$

To this end, the invention relates to a cryptographic communication process which transforms a value (X) represented by (n) elements of a finite ring (K) into an image value (Y) represented by (n') elements of the ring (K), characterized in that:

a) each element (n') of the image value (Y) is in the form of public polynomial equation with a low degree (D) which is greater than or equal to 2 (typically D=2 or 3) composed of the elements (n) of the value (X);

b) the image value (Y) can also be obtained from the value (X) through a transformation comprising the following steps, at least some of which require the knowledge of a cryptographic secret:

b1) applying to the value (X) a first secret polynomial transformation (s) having a degree 1 composed of the (n) elements of the value (X) in order to obtain a first image (I1) with (n) elements;

b2) forming one or more branches, each of which branches is composed of elements of the first image (I1) (for example, the first branch comprises the $n_1$ first elements of I1, the second branch comprises the $n_2$ subsequent elements, etc., or the same element could also be present in several branches), and

•in at least one (e) (or possibly all) of the branches, the ($n_e$) elements of the branch are considered to represent a variable or a small number (k) of variables (x, x', x", . . . . , $x^k$) belonging to an extension ($L_W$) with a degree W of the ring (K) with $W*k=n_e$, and applying to at least this branch (e) a transformation defined as follows:

$$f_e: L_W^k \to L_W^k$$

$$(x, x', x", \ldots, x^k) \to (y, y', y", \ldots, y^k)$$

noting that (y, y', y", . . . . , $y^k$) is the image of (x, x', x", . . . , $x^k$) from the transformation $f_e$, with $f_e$ verifying the following two properties:

b2.1) in a base (B) of the ring extension ($L_W$), each component of the image (y, y', y", . . . . , $y^k$) is expressed in the form of a polynomial composed of the components of (x, x', x", . . . . , $x^k$) in this base, which polynomial has a total degree less than or equal to the degree (D) of the public polynomial equation;

b2.2) expressed in the ring extension ($L_W$), the transformation ($f_e$) is such that it is possible (except perhaps for certain entries, the number of which is negligible relative to the total number of entries) to calculate the antecedents of ($f_e$) when they exist (this calculation is carried out either by means of an exhaustive search when $n_e$ is very small, or by using a mathematical algorithm for solving this type of polynomial equation in finite rings);

•and of applying, to the other possible branches, polynomial transformations with a degree less than or equal to the degree (D) formed of the components with value in the ring (K);

b3) a (secret or public) polynomial with a degree less than or equal to (D) is added at the output of the branch thus transformed or the other branches, which polynomial depends only on the variables of the branches situated immediately ahead of this branch (this step is not mandatory; it is possible to add the null polynomial).

b4) with the branch thus transformed, or the plurality of branches thus transformed then concatenated (that is, grouped), constituting a second image (I2);

b5) applying to the second image (I2) a second secret polynomial transformation (t), having a degree 1 composed of the elements of the second image (I2) in order to obtain a third image (I3) having a determined number of elements; and b6) selecting (n') elements from among the set of elements in the third image (I3) to form the image value (Y) (for example the first 1s; or in certain variants, selecting all the elements of I3, in which case Y=I3).

The invention also relates to an asymmetric signature verification process and an asymmetric authentication process which use the above-mentioned communication process.

BRIEF DESCRIPTION OF THE DRAWINGS

Other details and advantages of the invention in the course of the following description of several preferred but non-limiting embodiments, in reference to the appended drawings, in which.

DESCRIPTION OF THE PREFERRED EMBODIMENTS

Figure 1:
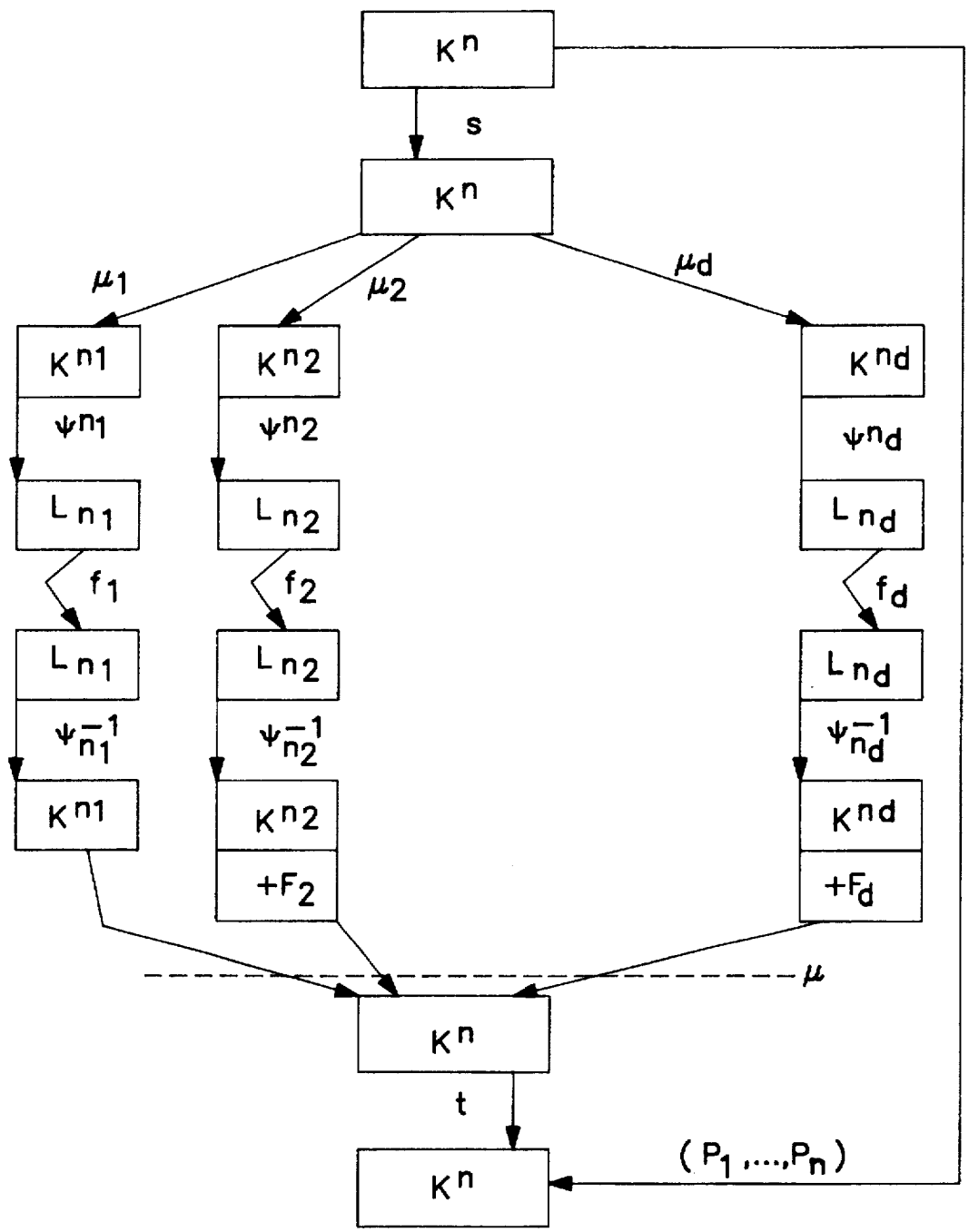
FIG. 1 shows the concatenation of the transformations used to process a message.

First, before the invention is presented, a brief mathematical review specifically related to the properties of finite fields will be provided.

Description and properties of finite fields.

1) Function f:

Let K be a finite field with a cardinal q and a characteristic p (typically, though not necessarily, q=p=2). let $L_N$ be an extension of K with a degree of N, let $\beta_{i,j}$, $\alpha_i$ and $\mu_0$ be elements of $L_n$, let $\theta_{i,j}$, $\phi_{i,j}$ and $\xi_i$ be integers, and let f be the following application:

$$f: L_N \dashrightarrow L_N$$

$$x \dashrightarrow \Sigma_{i,j} \beta_{i,j}*X^{Q+P} + \Sigma_i \alpha_i*X^S + \mu_0$$

in which $Q=q^{\theta_{i,j}}$, $P=q^{\phi_{i,j}}$ and $S=q^{\xi_i}$ in which f is a polynomial composed of x and (*) is the multiplication function. It will be noted that Q, P and S may possibly designate several values in this cryptograph, since there can be several $\theta_{i,j}$, $\phi_{i,j}$ and $\xi_i$.

Moreover, for any integer $\lambda$, $x \dashrightarrow x^{q^\lambda}$ is a linear application of LN $\dashrightarrow$ LN. Therefore f is a quadratic function.

If B is a base of $L_N$, then the expression of f in the base B is:

$$f(x_1, \ldots, x_N) = P_1(x_1, \ldots, x_N), \ldots, P_N(x_1, \ldots, x_N))$$

in which $P_1, \ldots, P_N$ are polynomials with a total degree of 2 composed of N variables $x_1, \ldots, x_N$.

The polynomials $P_1, \ldots, P_N$ are calculated by using a representation of $L_N$. A representation of $L_N$ is typically the datum of an irreducible polynomial $i_N(X)$ on K, with the degree N, which makes it possible to identify $L_N$ with $K[X]/(i_N(X))$. It is then easy to calculate the polynomials $P_1, \ldots, P_N$.

2) Inversion of f.

Let $\mu$ be the degree in x of the polynomial f. f is not necessarily a bijection of $L_N \dashrightarrow L_N$; however:

1) with "a" being an element of $L_N$, there are known algorithms which make it relatively easy to find all the values of x in $L_N$ (if any exist) such that f(x)=a, when $\mu$ is not too large (for example for $\mu \geq 1,000$)].

2) Furthermore, for each "a" of $L_N$, there are at most "$\mu$" solutions in x of f(x)=a.

3) In some cases, f can be bijective.

Basic HFE algorithm for the enciphering/deciphering system.

A first version of the novel HFE algorithm will now be described. This version is not limiting, and more general versions are presented in subsequent sections.

A field K, comprising $q=p^m$ elements, is public. Each message is composed of n elements of K. For example, if p=2, each message has n*m bits. n is also public. n is separated into d integers: $n = n_1 + \ldots + n_d$.

Each of these integers $n_e (1 \leq e \leq d)$ is associated with an extension $Ln_e$ of the field K with the degree $n_e$ (the symbol <= means "less than or equal to").

Let "word" be a value represented by components of K. For example, an element of $Ln_e$, ($1<=e<=d$), can be represented as a word with a length $n_e$. In the enciphering mechanism to be described here, quadratic functions $f_1, \ldots, f_d$, which are analogous to the function f described above will be used, with $N=n_1$ for $f_1$, $N=n_2$ for $f_2$, etc. These functions will generate d words. These d words will then be combined into one word with a length n.

•The secret objects are:

1) two affine bijective transformations s and t of $K^n$ - - - - - - - →$K^n$. These affine bijections can be represented in a base by polynomials with a degree equal to 1 and with coefficients in K.

2) the separation of n into d integers: $n=n_1+ \ldots +n_d$.

3) The representation of the fields $Ln_1, \ldots, Ln_d$. These "representations" are the result of a choice of d irreducible polynomials. $\Psi n_e$ is noted as the isomorphism from $K^{ne}$ to $Ln_e$ described by this representation, with e such that $1<=e<=d$.

4) The quadratic functions $f_1, \ldots, f_d$ are of the same type as the function f described in the paragraph entitled "function f" (using $N=n_e$ and $1<=e<=d$).

First note: all these objects are secret a priori, but in fact the objects in points 2), 3), and 4) above can also be public a priori. In effect, the security of the algorithm resides chiefly in the secret transformations s and t.

Second note: s and t are bijective applications, but they can also be "quasi bijective", meaning that they can be applications which have no more than a few antecedents.

The enciphering mechanism is described in FIG. 1. The sequence of operations runs from top to bottom. The affine bijective transformation s of $K^n$ - - - - - - - →$K^n$ occurs first.

The functions $\mu_1, \ldots, \mu_d$ are projection functions of $K^n$ - → - - - - - $K^{ne}$ (in which $1<=e<=d$), and $\mu$ is the inverse concatenation function. In a way, the functions $\mu_1, \ldots, \mu_d$ separate the n elements into d "branches".

The isomorphism $\Psi n_e$ is applied from the various fields $K^{ne}$ to the various field representations $Ln_1, \ldots Ln_d$, then the quadratic functions $f_1, \ldots, f_d$ are respectively applied from $Ln_1, \ldots Ln_d$ to $Ln_1, \ldots, Ln_d$. Next, the inverse isomorphism $(\Psi n_e)^{-1}$ is applied from the various field representations $Ln_1, \ldots, Ln_d$ to the various fields $K^{ne}$.

Next, the inverse concatenation function $\mu$ is applied from $K^{ne}$ to $K^n$. Finally, the affine bijective transformation t of $K^n$ - - - - - - - →$K^n$, which has a general form similar to the transformation s, occurs.

$F_2$ is a function with a degree less than or equal to (D) which depends on the variables of the block furthest to the left. More generally, $F_i$ ($2<=i<=d$) is a function with a degree less than or equal to (D) which depends on the variables of the blocks 1, 2, . . . , i-1.

NOTE: These functions $F_2, \ldots, F_d$ produce a Feistel diagram in blocks. Often they are not used in the HFE algorithm, in which case $F_2= \ldots =F_d=0$.

It must be noted, and this is an important point, that the composition of all these operations generates a quadratic function when this function is expressed by means of its components in a base. Therefore, this function can be given by n polynomials ($P_1, \ldots, P_n$) with coefficients in K, which polynomials make it possible to calculate the enciphered text (y) as a function of the unenciphered text x.

•The public objects are:

1) The field K of $l=p^m$ elements, and the length n of the messages.

2) The n polynomials ($P_1, \ldots, P_n$) composed of n variables of K. Thus, anyone can encipher a message (the enciphering algorithm is quite public, in conformity with the characteristics of the invention claimed).

Moreover, deciphering is possible if the secret objects are known. In effect, it is then possible to invert all the operations described in FIG. 1. Thus, the inversion of the functions $f_e$ consists of solving a polynomial equation with an unknown in the field $Ln_e$, as indicated for f in the paragraph above entitled "inversion of f". It must be noted, however, that $f_e$ is not necessarily bijective. It is then possible to obtain several antecedents. In this case, the choice of the unenciphered text will be determined with the aid of a redundancy inserted into the unenciphered text, and the deciphered text will be the one which contains this redundancy. If the functions are not bijective, it will be necessary to consider inserting this redundancy into the unenciphered message systematically.

Example of utilization of the algorithm in signature.

Two cases must be considered:

•The functions are bijective.

If H is the result of the "hash" function applied to a message to be signed (for example, H has a format of 128 bits), then the signature S is $S=HFE^{-1}(H)$.

Thus, due to the fact that the HFE enciphering function is public, anyone can verify the signature by executing: H'=HFE (S) and by verifying that H'=H. The sender of the signature must obviously know the secret in order to calculate S.

•The functions are not bijective.

In this case, it is possible to choose a number of bits at the input of HFE which is greater than the number of bits at the output, in order to be almost certainly able to calculate antecedents using the HFE algorithm.

For example, H could be expressed in 128 bits and S in 128+20 =148 bits.

Specific cases of implementation.

There are several ways to execute the HFE algorithm, all of which offer great advantages related to its practical execution and implementation.

•The case of algorithm with only one branch (that is: with d=1).

This version has only one (large) branch and therefore, in each equation, all the variables—that is, all the bits of the message—are involved. Taking into account the large size of this branch, this form of execution does not have the potential weaknesses of branches of small size.

•The case of small branches with the same function f.

This particular case involves small branches, for example with values of 12 bits, and the same function f. This version is particularly advantageous because it can easily be implemented in small central processors contained, for example, in chip cards, and its implementation is possible with the aid of a program or a mathematical coprocessor.

First variant of the HFE algorithm

The function f used in each branch, as already described in this document, is a polynomial equation with a single variable x in a finite field. Expressed in a base, this function f is expressed as an equation with a total degree equal to two.

In fact, another type of function f can be used which differs slightly from the general model defined previously. This novel type consists of choosing for f a function which depends on several finite field variables, for example two variables $x_1$ and $x_2$ such that, in a base, the expression as a function of coordinates retains a total degree equal to two and that it is always possible to recalculate the antecedents of a given value of f when they exist.

This variant will be better understood through the numeric example below. Consider a branch of the algorithm with values of 64 bits and with p=2. In the variant, let f depend on two variables x and x' of 32 bits each, with f(x, x')=(y, y') such that:

$$\begin{cases} y = x^4 = x * x' = x' & (1) \\ y' = x^{17} + x^4 * x' + x^3 & (2) \end{cases}$$

(noting that the use of this exact function is not necessarily recommended, and is given only as an example).

In order to determine the pair (x, x') from (y, y'), it is possible, for example, to proceed in the following way:

From the equation (1), extract:

$$x' = (y - x^4)/(x+1) \quad (3)$$

Hence, from the equation (2), extract:

$$y'(x+1)^3 = x^{17}(x+1)^3 + x^4(y-x^4)(x+1)^2 + (y-x^4)^3 \quad (4)$$

Note that (4) is a polynomial equation with a single variable x. As indicated above, mathematicians already know some general methods for solving this type of equation, and thus it possible to solve (4), which makes it possible to define the values of x which solve the equation; then, by substituting these values for x in the equation (3), the value of x' may be deduced.

NOTE: The currently known techniques for solving equations with several variables in finite fields make it possible to correctly solve other types of equations than the one illustrated in this example. In particular, equations in which it is not necessary to express a variable as a function of the others and replace it.

Second variant of the HFE algorithm

Of course, the description of the HFE algorithm and its variants does not limit the invention claimed to the utilization of polynomial equations with only one degree: the degree 2. It is entirely possible to use the degree 3; in this case there is a public form with the degree 3.

Likewise, the degree 4 or even 5 is possible. However, it is necessary for the degree to be low enough so that the public equations resulting from them remain easy for a computer to store and to calculate.

The choice of parameters is also important in order to ensure maximum security and to elude, as much as possible, any attack of cryptanalysis. Thus, for security reasons, it is preferable that:

1) in each branch, there is at least one variable of 32 bits, and preferably at least 64 bits, 2) there are no equations with the form: $\Sigma \gamma_{ij} x_i y_j + \Sigma \beta_j y_j + \delta_0 = 0$ in which at least one of the coefficients $\gamma_{ij}$, $\alpha_i$, $\beta_j$ or $\delta_0$ are non null and, which are always verified if the $y_j$ coefficients are the components of the enciphered text and the $x_i$ coefficients are the components of the unenciphered text. NOTE: among other things, it was because such a condition was not verified that the Matsumoto-Imai algorithm cited above was revealed to be not entirely secure.

3) there is no equation with the form:

$$\Sigma \gamma_{ijk} x_i y_j y_k + \Sigma \alpha_{ij} x_i y_j + \Sigma \beta_{ij} y_i y_j + \Sigma \mu_i x_i + \Sigma \nu_i y_i + \delta_0 = 0$$

that is, with a total degree of 3 and with a degree of 1 in x.

4) more generally, for security purposes, it is preferable that there be no equation with a "low" degree which is always verified between the coordinates of the unenciphered and enciphered messages, except for the linear combinations of the products of the public equations in small polynomials).

Third variant of the HFE algorithm

It has been indicated that in order to use the HFE algorithm when the function is not bijective, it is possible to introduce redundancy into the unenciphered text.

There is another possibility: in effect, it is possible for the size of the enciphered value Y to be greater than the size of the unenciphered value X if new elements of K are inserted into the enciphered value. These new elements are also the ones which result from equations with a degree of two formed of the components of X. More generally, using the notations in FIG. 1, the same element of s(x) could be transmitted to several branches. It is also possible to add one or more branches composed of arbitrary equations with a degree of two into a base, in which case these additional branches are used to distinguish the correct antecedent of the other branches.

Fourth variant of the HFE algorithm

Instead of making public all the equations which result in the final function in FIG. 1, one or more of them can be kept secret. This means that, instead of making $(P_1, \ldots, P_n)$ public, it is possible to make only part of these equations public, in which case the enciphering is carried out by calculating only the public $(P_1, \ldots, P_n)$ polynomials.

In deciphering, all the possible values for the non-public polynomials $P_i$ are tried, which provides several possible deciphered messages a priori, and the correct message is marked as before: either by the introduction of redundancy into the unenciphered message, or by means of the method indicated in the third variant.

NOTE: the fact that one or more public equations are thus eliminated can in some cases make it even more difficult to discover the structure of the fields hidden by the HFE algorithm.

Figure 2:
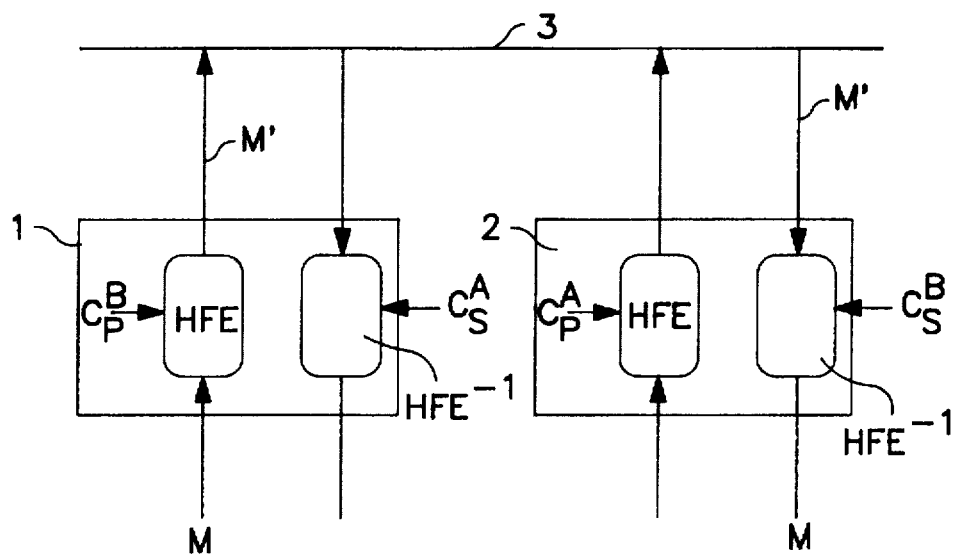
FIG. 2 shows a communication device used to execute the enciphering/deciphering of a message.

Explanation of FIG. 2

FIG. 2 schematically illustrates an example of the enciphering/deciphering system using the cryptographic algorithm described above.

Suppose there are two individuals A and B belonging to the same communications network, each of whom has a respective message sending/receiving device 1, 2. This device includes calculation means, for example a computer, designed to carry out the enciphering/deciphering of messages, and storage means. At least part of these calculation or storage means can be located in a portable object which incorporates a microprocessor or micro-wired logic circuits which define areas to which access is controlled, and can therefore contain secret information such as cryptographic keys (see, for example, the portable object described in French patent No. 2.401.459 corresponding to U.S. Pat. No. 4,211,919).

Each device incorporates the HFE algorithm as described above, particularly in the form of a program, as well as the inverse algorithm $HFE^{-1}$.

The two devices are linked to one another by means of a communication line 3.

Both individuals A and B possess a pair of keys, respectively: a public key $Cp^A$ and $Cp^B$ and a secret key $Cs^A$ and $Cs^B$ correlated with the corresponding public key $Cp^A$ or $Cp^B$. If A and B do not have the means to calculate the pairs of keys, this calculation could be done by the network, giving it a certain authority with regard to each member of the network. If these two individuals want to dialogue with one another in a protected mode, that is, without anyone's being able to understand the data exchanged, then they will implement the following procedure:

The individual A sends B his public key $Cp^A$, and B sends A his public key $Cp^B$. In a variant, the network can hold the public keys of all the members in primary storage and communicate them to the members on request. Once A has received the public key $Cp^B$, A will use it to encipher, with the aid of the cryptographic algorithm HFE, a message M which he desires to send to B, and a message M'. This message, once it is received by B, is deciphered with the aid of the cryptographic algorithm $HFE^{-1}$ and the secret key $Cs^B$. Only B can decipher the message, since he is the only member of the network to possess this key. For the transmission of messages from B to A, the procedure is completely analogous.

Figure 3:
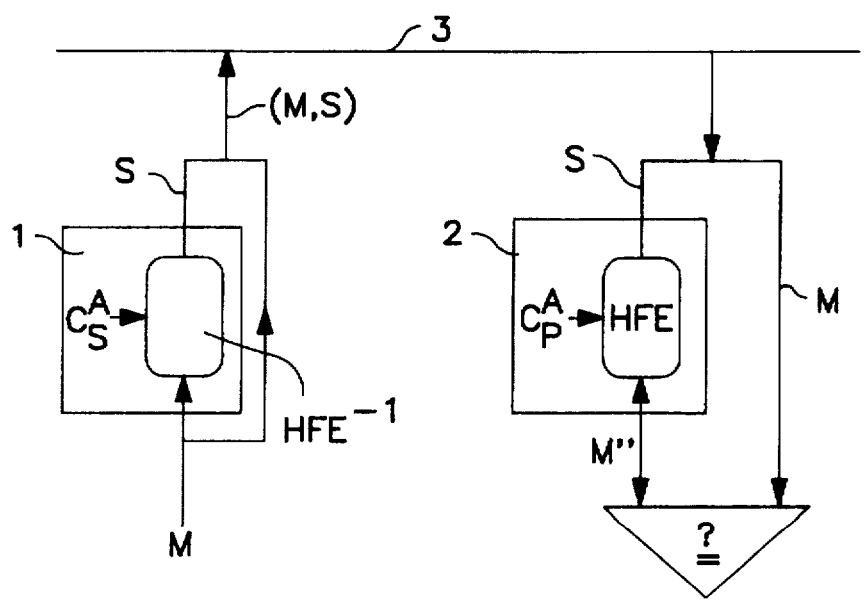
FIG. 3 shows this same device, used to execute the signature of a message and its verification.

Explanation of FIG. 3

FIG. 3 schematically illustrates an example of the utilization of the system in FIG. 2 to implement a calculation and signature verification procedure which uses the cryptographic algorithm described above.

In this case, it is necessary that the transmission of messages be carried out with authentication, that is, that the receiver of the message M be able to ascertain that the message comes from a certain person. For example, suppose that A wants to send B an authenticated message. The two interlocutors will implement the following procedure:

First, the individual A will send B his public key $Cp^A$ or, in a variant, B can also request this key from the network. Then, A will encipher the message with his own secret key $Cs^A$ and the cryptographic algorithm $HFE^{-1}$. The result obtained is called the signature S of the message. Then, the message (which in this case travels unencrypted) and its signature are sent to B. B deciphers the signature with the aid of the cryptographic algorithm HFE and the public key $Cp^A$, which he received previously. The result obtained, notated M", must be the same as the received message M. If this is in fact the case, it proves that the signature was calculated with the aid of the secret key $Cs^A$ and therefore that the message does in fact come from A, the only member of the network to possess this key.

A known improvement of this system consists of calculating not only the signature of the message, but the signature of a concentration of the message. Thus, using a "hash" function, a relatively large message can be compressed into a datum H which is characteristic of the message. This "hash" function can be implemented using standard hash functions (such as MD5 or SHA).

In summary, the invention results in the following discoveries:

1. The inventor has shown (cf document Crypto '95, pages 248 through 261) that the initial algorithm by Matsumoto and Imai was not cryptographically solid. This algorithm consisted of "hiding" a bijection f with the form $f(b)=a^{1+Q}$ in which $Q=q^\theta$ by means of two affine transformations s and t.

2. The inventor has shown that it is possible to use much more general functions for f. In effect, the inventor has shown, on the one hand, that it was possible to use non bijective functions f, and on the other hand that it was possible to use the fact that it was known how to calculate antecedents for very diverse families of polynomials, for example by using PGCD calculations of polynomials or resultants of polynomials, or by using GRÖBNER bases.

3. It is necessary for at least one of the branches not to be too small. In effect, the inventor discovered that small branches lead to weak HFE algorithms.

4. Moreover, the inventor noted that it is sometimes possible to select only some of the elements which constitute the third image (I3) resulting from the transformation of the second image (I2) by means of the second secret polynomial transformation.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A cryptographic communication process which transforms a value (X) represented by (n) elements of a finite ring (K) into an image value (Y) represented by (n') elements of the ring (K), characterized in that:

a) each element (n') of the image value (Y) is in the form of a public polynomial equation having a low degree (D) greater than or equal to 2 composed of the elements (n) of the value (X);

b) obtaining the image value (Y) from the value (X) by means of a transformation comprising the following steps, at least some of which require the knowledge of a cryptographic secret:

b1) applying to the value (X) a first secret polynomial transformation (s) having a degree 1 composed of the (n) elements of the value (X) in order to obtain a first image (I1) with (n) elements; which (n) elements of the first image (I1) represent a variable or a small number (k) of variables $(x, x', x'', \ldots, x^k)$ belonging to an extension $(L_W)$ with the degree W of the ring (K) with $W*k=n$, b2) transforming the first image (I1) to a second image by applying to the first image (I1) a transformation defined as follows:

$$f: L_W^k \to L_W^k$$

$(x, x', x'', \ldots, x^k) \mapsto (y, y', y'', \ldots, y^k)$ noting that $(y, y', y'', \ldots, y^k)$ is the image of $(x, x', x'', \ldots, x^k)$ from the transformation f, knowing that f verifies the following two properties:

b2.1) in a base (B) of the extension $(L_W)$ of the ring, each component of the image $(y, y', y'', \ldots, y^k)$ is expressed in the form of a polynomial composed of the components of $(x, x', x'', \ldots, x^k)$ in this base, which polynomial has a total degree less than or equal to said degree (D) of the public polynomial equation;

b2.2) expressed in the extension $(L_W)$ of the ring, the transformation (f) is such that antecedents of (f) are calculated when they exist, except for certain entries, the number or which is negligible relative to the total number of entries;

b3) applying to the second image (I2) a second secret polynomial transformation (t) having a degree of 1, composed of the elements of the second image (I2) in order to obtain a third image (I3) having a determined number of elements; and b4) selecting (n') elements from the elements in the third image (I3) to form said image value (Y).

2. The process according to claim 1, in which said low degree (D) of the public polynomial equation is equal to 2.

3. The process according to claim 1, in which the number k of variables is equal to 1.

4. The process according to claim 3, in which said low degree (D) of the public polynomial equation is equal to 2.

(K) is a finite field, and said transformation (F) has the following form:

$$f: L_W \longrightarrow L_W$$

$$x \mapsto \Sigma_{i,j}\beta_{i,j}*x^{Q+P} + \Sigma_i \alpha_i * x^S + \mu_0$$

in which q is the cardinal of the field (K); $Q=q^{\theta i,j}$, $P=q^{\phi i,j}$, and $S=q^{\xi i}$, $\beta_{i,j}$, $\alpha_i$ and $\mu_0$ are elements of $L_W$, and $\theta^{i,j}$, $\phi^{i,j}$ and $\xi^i$ are integers, and in which the degree in x of the polynomial f is less than or equal to 1,000.

5. The process according to claim 1, such that there are no polynomial equations with a low total degree composed of the components of (x, x', x", . . . , $x^k$) and (y, y', y", . . . , $y^k$) other than linear combinations of the products of the public equations in small polynomials.

6. The process according to claim 1, such that there are no polynomial equations with the form: $\Sigma \gamma_{ij} x_i y_j + \Sigma \alpha_i x_i$ $\Sigma \beta_j y_j + \delta_0 = 0$, with at least one of the coefficients $\gamma_{ij}$, $\alpha_i$, $\beta_j$ or $\delta_0$ being non null, which are always verified if the coefficients $y_j$ are the components of the enciphered message, and the coefficients $x_i$ are the components of the unenciphered message.

7. The process according to claim 1, in which the ring (K) is a finite field and the extension ($L_W$) of the ring is an extension with a degree of W of the ring (K), which means that ($L_W$) is isomorphic with K[X]/g(X), in which g is an irreducible polynomial with a degree of W on K.

8. A process for the asymmetric authentication, by a first person called the verifier, of another person called the prover, characterized in that:

sending the prover a first value (Y) from the verifier;

returning to the verifier from the prover a second value (X) obtained by applying to the first value (Y) a transformation which corresponds to the inverse transformation of that which was the subject of claim 1;

applying to the second value (X) from the verifier the transformation from claim 1 and verifying by the verifier that the result conforms to a predetermined relation linked to the first value (Y).

9. A cryptographic communication process which transforms a value (X) represented by (n) elements of a finite ring (K) into an image value (Y) represented by (n') elements of the ring (K), characterized in that:

a) each element (n') of the image value (Y) is in the form of a public polynomial equation having a low degree (D) greater than or equal to 2 composed of the elements (n) of the value (X);

b) obtaining the image value (Y) from the value (X) by means of a transformation comprising the following steps, some of which require the knowledge of a cryptographic secret:

b1) applying to the value (X) a first secret polynomial transformation (s) having a degree 1 composed of the (n) elements of the value (X) in order to obtain a first image (I1) with (n) elements;

b2) forming one or more branches, each of which branches is composed of elements of the first image (I1) and,

•applying to at least one branch (e) the ($n_e$) elements of the branch representing a variable or a small number (k) of variables (x, x', x", . . . , $x^k$) belonging to an extension ($L_W$) with a degree W of the ring (K) with $W*k=n_e$, and a transformation defined as follows:

$$f_e: L_W{}^k \rightarrow L_W{}^k$$

$$(x, x', x", \ldots , x^k) \mapsto (y, y', y", \ldots , y^k)$$

noting that (y, y', y", . . . , $y^k$) is the image of (x, x', x", . . . , $x^k$) from the transformation $f_e$, with $f_e$ verifying the following two properties:

b2.1) in a base (B) of the extension ($L_W$) of the ring, each component of the image (y, y', y", . . . , $y^k$) is expressed in the form of a polynomial composed of the components of (x, x', x", . . . , $x^k$) in this base, which polynomial has a total degree less than or equal to said degree (D) of the public polynomial equation;

b2.2) expressed in the extension ($L_W$) of the ring, the transformation ($f_e$) is such that the antecedents of ($f_e$) when they exist may be calculated, except for certain entries, the number of which is negligible relative to the total number of entries

•and applying to the other potential branches polynomial transformations with a degree less than or equal to said degree (D) composed of the components with value in the ring (K);

b3) which branch thus transformed, or the plurality of branches thus transformed, then concatenated, constitutes a second image (I2);

b4) applying to the second image (I2) a second secret polynomial transformation (t), having a degree 1 composed of the elements of the second image (I2) in order to obtain a third image (I3) having a determined number of elements; and b5) selecting (n') elements from among the elements in the third image (I3) to form said image value (Y).

10. The process according to claim 9, in which a polynomial with a degree less than or equal to (D) is added at the output of the branch thus transformed or other branches, which polynomial depends only on the variables of the branches situated immediately ahead of this branch.

11. The process according to claim 9, in which the first image (I1) has several branches, one of which branches manipulates values of at least 32 bits.

12. A process for the asymmetric signature of a message (X) and for the verification of this signature, characterized in that the signature is obtained by applying to the message, or to a public transformation of the message, a transformation which corresponds to the inverse transformation of that which is the subject of the process in claim 1, and in that the verification consists of checking that a result (Y) is obtained which conforms to predetermined relations linked to the message to be signed.

13. A process for the asymmetric signature of a message (X) and for the verification of this signature, characterized in that the signature is obtained by applying to the message, or to a public transformation of the message, a transformation which corresponds to the inverse transformation of that which is the subject of the process in claim 2, and in that the verification consists of checking that a result (Y) is obtained which conforms to predetermined relations linked to the message to be signed.

14. A process for the asymmetric signature of a message (X) and for the verification of this signature, characterized in that the signature is obtained by applying to the message, or to a public transformation of the message, a transformation which corresponds to the inverse transformation of that which is the subject of the process in claim 3, and in that the verification consists of checking that a result (Y) is obtained which conforms to predetermined relations linked to the message to be signed.

15. A process for the asymmetric signature of a message (X) and for the verification of this signature, characterized in that the signature is obtained by applying to the message, or to a public transformation of the message, a transformation which corresponds to the inverse transformation of that which is the subject of the process in claim 4, and in that the verification consists of checking that a result (Y) is obtained which conforms to predetermined relations linked to the message to be signed.

16. A process for the asymmetric signature of a message (X) and for the verification of this signature, characterized in that the signature is obtained by applying to the message, or to a public transformation of the message, a transformation which corresponds to the inverse transformation of that which is the subject of the process in claim 5, and in that the verification consists of checking that a result (Y) is obtained which conforms to predetermined relations linked to the message to be signed.

17. A process for the asymmetric signature of a message (X) and for the verification of this signature, characterized in that the signature is obtained by applying to the message, or to a public transformation of the message, a transformation which corresponds to the inverse transformation of that which is the subject of the process in claim 6, and in that the verification consists of checking that a result (Y) is obtained which conforms to predetermined relations linked to the message to be signed.

18. A process for the asymmetric signature of a message (X) and for the verification of this signature, characterized in that the signature is obtained by applying to the message, or to a public transformation of the message, a transformation which corresponds to the inverse transformation of that which is the subject of the process in claim 7, and in that the verification consists of checking that a result (Y) is obtained which conforms to predetermined relations linked to the message to be signed.

19. A process for the asymmetric signature of a message (X) and for the verification of this signature, characterized in that the signature is obtained by applying to the message, or to a public transformation of the message, a transformation which corresponds to the inverse transformation of that which is the subject of the process in claim 8, and in that the verification consists of checking that a result (Y) is obtained which conforms to predetermined relations linked to the message to be signed.

20. A process for the asymmetric signature of a message (X) and for the verification of this signature, characterized in that the signature is obtained by applying to the message, or to a public transformation of the message, a transformation which corresponds to the inverse transformation of that which is the subject of the process in claim 9, and in that the verification consists of checking that a result (Y) is obtained which conforms to predetermined relations linked to the message to be signed.

* * * * *